US009014670B2

(12) United States Patent
Wang et al.

(10) Patent No.: US 9,014,670 B2
(45) Date of Patent: Apr. 21, 2015

(54) METHOD AND MOBILE TERMINAL FOR NOTIFYING AND DISPLAYING MESSAGE

(71) Applicant: Tencent Technology (Shenzhen) Company Limited, Shenzhen (CN)

(72) Inventors: Qing Wang, Shenzhen (CN); Haoran Guo, Shenzhen (CN); Yixia Yuan, Shenzhen (CN); Xunchang Zhan, Shenzhen (CN); Chunyou Lin, Shenzhen (CN); Pengtao Li, Shenzhen (CN); Jiashun Song, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 26 days.

(21) Appl. No.: 14/040,359

(22) Filed: Sep. 27, 2013

(65) Prior Publication Data

US 2014/0038561 A1 Feb. 6, 2014

Related U.S. Application Data

(63) Continuation of application No. PCT/CN2013/079946, filed on Jul. 24, 2013.

(30) Foreign Application Priority Data

Aug. 1, 2012 (CN) .......................... 2012 1 0271546

(51) Int. Cl.
*H04M 1/66* (2006.01)
*H04W 12/02* (2009.01)

(52) U.S. Cl.
CPC ....................................... *H04W 12/02* (2013.01)

(58) Field of Classification Search
USPC ............................ 455/410, 411, 412.1, 412.2, 455/414.1–414.4, 567; 705/7.18–7.21
See application file for complete search history.

(56) References Cited

U.S. PATENT DOCUMENTS

| 2009/0048893 A1* | 2/2009 | Wang et al. ........................ 705/8 |
| 2010/0216440 A1* | 8/2010 | Heikkila et al. ............... 455/415 |
| 2011/0208418 A1* | 8/2011 | Looney et al. ................ 701/200 |

FOREIGN PATENT DOCUMENTS

| CN | 1941708 A | 4/2007 |
| EP | 1998543 A1 | 12/2008 |

OTHER PUBLICATIONS

Tencent Technology (Shenzhen) Company Limited, International Search Report and Written Opinion, PCT/CN2013/079946, Oct. 31, 2013, 10 pgs.

*Primary Examiner* — Wayne Cai
(74) *Attorney, Agent, or Firm* — Morgan, Lewis & Bockius LLP

(57) ABSTRACT

The present invention discloses a method and a mobile terminal for displaying an event notification. While running an application on a display of the mobile terminal, the terminal receives an event notification. If the event notification is compatible with the application, the terminal generates a user-interactive icon for the event notification on the display. In response to a user selection of the user-interactive icon, the terminal determines whether the event notification corresponds to a public or private event. If the event notification corresponds to a public event, the terminal replaces the application with a display of a list of public events including the public event. If the event notification corresponds to a private event, the terminal prompts a user to enter identity information for accessing private events and replaces the application with a display of a list of private events including the private event after verifying the user-entered identity information.

19 Claims, 10 Drawing Sheets

METHOD AND MOBILE TERMINAL FOR NOTIFYING AND DISPLAYING MESSAGE

RELATED APPLICATIONS

This application is a continuation application of PCT Patent Application No. PCT/CN2013/079946, entitled "METHOD AND MOBILE TERMINAL FOR NOTIFYING AND DISPLAYING MESSAGE" filed on Jul. 24, 2013, which claims priority to Chinese Patent Application No. 201210271546.1, entitled "METHOD AND MOBILE TERMINAL FOR DISPLAYING A NOTIFICATION MESSAGE" filed on Aug. 1, 2012, both of which are incorporated by reference in their entirety.

TECHNICAL FIELD

The disclosed implementations relate generally to the field of mobile communications, and in particular, to a method and a mobile terminal for notifying and displaying a message.

BACKGROUND

With the popularity of intelligent mobile terminals, various mobile terminal applications emerge. For example, some mobile terminals provide functions such as privacy protection and harassment interception. Currently, when an event happens, e.g., a message arriving, a dialog box pops up in the mobile terminal to prompt a user that an event happens. The user clicks a button of "confirm" dialog box and then the dialog box disappears. Alternatively, when a message arrives, a small icon is displayed on a desktop of the mobile terminal to remind the user, but the icon cannot be clicked.

For a manner where a dialog box pops up when a message arrives, it can play a role of prompt. But when a series of frequent messages arrive simultaneously, continuously popping-up dialog boxes easily bring harassment to the user. In addition, the information amount displayed in the dialog box is quite limited, so that if the user wants to know more detailed information, the user must open the client software manually to enter a corresponding function module. Alternatively, for a manner where a small icon is displayed on the desktop when a message arrives, the small icon cannot be clicked to enter the client, so that the user must open the client software manually to view the content of the message. The operation is inconvenient for users.

SUMMARY

A method and a mobile terminal that can display a corresponding message notification icon on a specified interface and display a corresponding message when receiving a selection of the message notification icon will be convenient for the user. Embodiments of the present invention provide a method and a mobile terminal for processing and displaying an event notification. The technical solutions are as follows.

An embodiment of the present invention provides a method for displaying a notification message, including:

setting a message category and a message displaying interface corresponding to the message category in a mobile terminal;

detecting whether a message of the message category arrives and a current interface of the mobile terminal; and displaying, on the message displaying interface, a message notification icon of the message when the current interface is the message displaying interface and the message arrives.

An embodiment of the present invention provides a mobile terminal, including:

a setting module, configured to set a message category and a message displaying interface corresponding to the message category in the mobile terminal;

a first detecting module, configured to detect whether a message of the message category arrives and a current interface of the mobile terminal; and a notification module, configured to display, on the message displaying interface, a message notification icon of the message when the current interface is the message displaying interface and the message arrives.

In accordance with some embodiments, a method for processing event notifications at a mobile terminal having one or more processors and memory for storing one or more programs to be executed by the one or more processors, comprises: while running an application on a display of the mobile terminal: receiving an event notification; if the event notification is compatible with the application, generating a user-interactive icon for the event notification at a predefined location on the display; in response to a user selection of the user-interactive icon, determining whether the event notification corresponds to a public event or a private event; if the event notification corresponds to a public event, replacing the application with a display of a list of public events including the public event corresponding to the event notification; and if the event notification corresponds to a private event: prompting a user to enter identity information for accessing private events; and replacing the application with a display of a list of private events including the private event corresponding to the event notification after verifying the user-entered identity information.

In accordance with some embodiments, a mobile terminal, comprises: one or more processors; memory; and one or more programs stored in the memory and to be executed by the processor, the one or more programs including instructions for: while running an application on a display of the mobile terminal: receiving an event notification; if the event notification is compatible with the application, generating a user-interactive icon for the event notification at a predefined location on the display; in response to a user selection of the user-interactive icon, determining whether the event notification corresponds to a public event or a private event; if the event notification corresponds to a public event, replacing the application with a display of a list of public events including the public event corresponding to the event notification; and if the event notification corresponds to a private event: prompting a user to enter a password for accessing private events; and replacing the application with a display of a list of private events including the private event corresponding to the event notification after verifying the user-entered identity information.

In the method and the mobile terminal for processing and displaying an event notification provided by the embodiments of the present invention, the corresponding event notification icon is displayed on the specified interface, and the corresponding event can be displayed by clicking the event notification icon. This method and mobile terminal not only prevents harassment on the user, but also improves convenience and efficiency of the operation.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION

In order to make the objectives, technical solutions and advantages of the present invention clearer, embodiments of the present invention are described in detail in the following with reference to the accompanying drawings.

Figure 1:
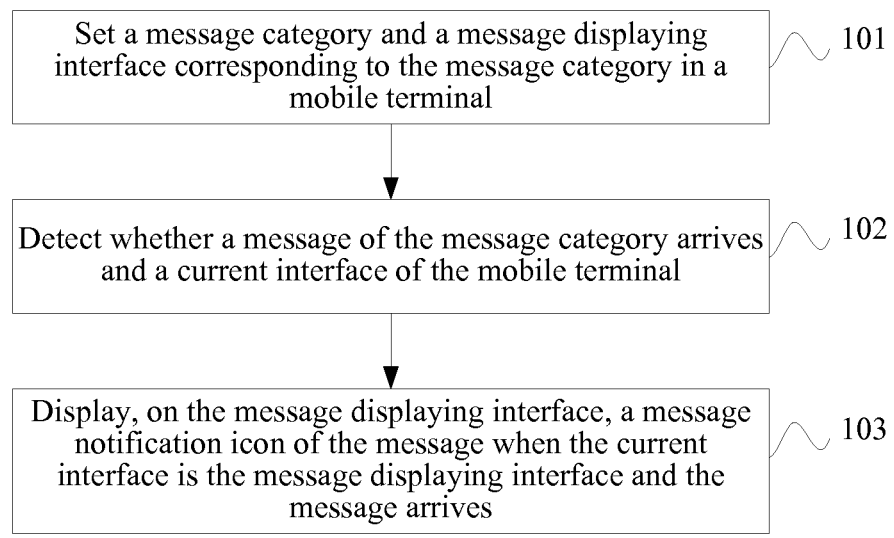
FIG. 1 is a flow chart of a method for displaying a notification message in accordance with some embodiments.

FIG. 1 is a flow chart of a method for displaying a notification message provided by an embodiment of the present invention. An executive body of this embodiment is a mobile terminal. Referring to FIG. 1, this embodiment includes:

101: Set a message category and a message displaying interface corresponding to the message category in a mobile terminal

102: Detect whether a message of the message category arrives and a current interface of the mobile terminal.

103: Display, on the message displaying interface, a message notification icon of the message when the current interface is the message displaying interface and the message arrives.

Specifically, the detecting whether the message of the message category arrives and the current interface of the mobile terminal includes: detecting whether the message of the message category arrives; and detecting whether the current interface is the message displaying interface when the message of the message category arrives.

Specifically, the detecting whether the message of the message category arrives and the current interface of the mobile terminal includes: detecting whether the current interface is the message displaying interface; and detecting whether the message of the message category arrives when the current interface is the message displaying interface.

Specifically, the setting the message category and the message displaying interface corresponding to the message category in the mobile terminal includes: setting one message category in the mobile terminal, and setting that the message category corresponds to one message displaying interface; or, setting a plurality of message categories in the mobile terminal, and respectively setting that each message category corresponds to one message displaying interface; or, setting a plurality of message categories in the mobile terminal, and setting that the plurality of message categories corresponds to one message displaying interface.

Specifically, the setting the message category and the message displaying interface corresponding to the message category in the mobile terminal includes: setting the message category and the message displaying interface corresponding to the message category according to requirement information of a user; and/or, setting the message category and the message displaying interface corresponding to the message category according to a parameter preset by a server.

Specifically, the displaying, on the message displaying interface, the message notification icon of the message when the current interface is the message displaying interface and the message arrives further includes: when a plurality of messages arrives, counting the messages, and displaying, on the message displaying interface, a message notification icon of the messages and the counted number of the messages.

In the method for displaying a notification message provided by the embodiment of the present invention, a corresponding message notification icon is displayed on a specified message displaying interface, thereby not only playing a role of reminding a user, but also preventing harassment caused by a plurality of repeated prompts on the user. In addition, a displaying interface is set, which further improves flexibility of the operation of the mobile terminal, and improves convenience of the operation and the usage efficiency.

Figure 2:
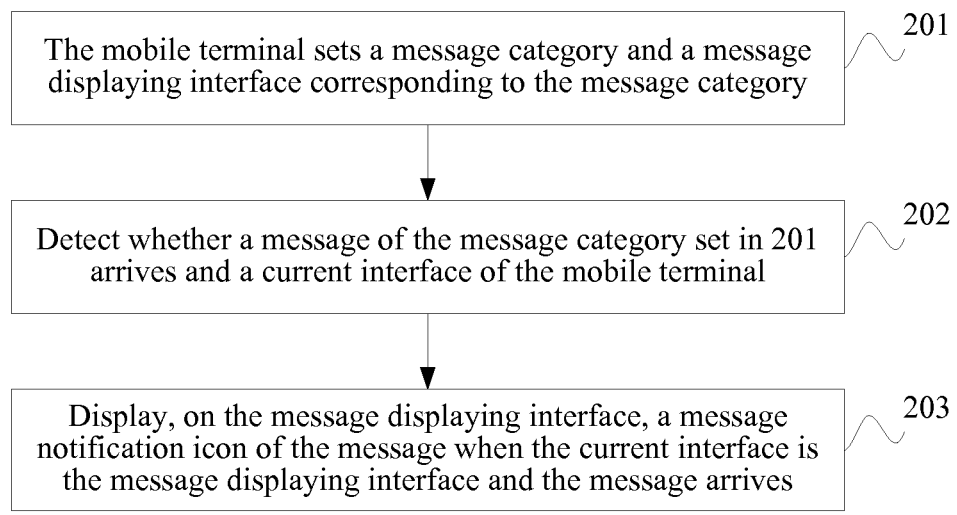
FIG. 2 is a flow chart of a method for displaying a notification message in accordance with some embodiments.

FIG. 2 is a flow chart of a method for displaying a notification message provided by an embodiment of the present invention. An executive body of this embodiment is a mobile terminal, which may be a smart phone, a tablet computer, a PDA (Personal Digital Assistant, personal digital assistant), a mobile terminal and the like. A format of the message includes, but is not limited to, messages such as privacy information/privacy call, intercepted information/intercepted call and the like. Referring to FIG. 2, this embodiment includes:

201: The mobile terminal sets a message category and a message displaying interface corresponding to the message category.

Specifically, that the mobile terminal sets the message category and the message displaying interface corresponding to the message category includes:

that the mobile terminal may set one message category or a plurality of message categories according to requirements of the user, for example, may set a message category of privacy information/privacy call, and may also set two message categories, namely privacy information/privacy call and intercepted information/intercepted call, and definitely, may set a plurality of message categories, where the number of the set message categories may be selected flexibly according to actual requirements, which is not limited in the embodiment of the present invention.

When the mobile terminal finishes setting the required message category, the mobile terminal sets a message displaying interface corresponding to the message category according to the set message category, for example, may set a set message of privacy information/privacy call to be displayed on a desktop, that is, set the desktop as a message displaying interface of the message of privacy information/privacy call, and may also set other interfaces such as a short message interface, a toolbar interface and the like, which can be set flexibly according to the habits and requirements of the user.

A setting manner of setting the message category and the message displaying interface corresponding to the message category may be implemented through a keyboard, a button of the mobile terminal, or through handwriting and voice action or the like, which is not limited in the embodiment of the present invention.

In addition, it should be noted that, when the set message category needs to be changed (for example, cancel the message of intercepted information/intercepted call), the message category can be canceled or added at any time; when the message displaying interface corresponding to the message category needs to be changed (for example, change the message displaying interface of the message of intercepted information/intercepted call from a main menu interface to the toolbar interface), the change may also be made flexibly.

The mobile terminal may set one message category according to the requirements of the user, and set one message displaying interface for one message category correspondingly, for example, may set the message category of privacy information/privacy call, and set a desktop corresponding to the message as the message displaying interface.

The mobile terminal may also set a plurality of message categories, and each message category corresponds to the message displaying interface set respectively; for example, the user may set the desktop as the message displaying interface of the message of privacy information/privacy call, and set the toolbar interface as the message displaying interface of the message of intercepted information/intercepted call.

The mobile terminal sets a plurality of message categories, and the plurality of message categories corresponds to one message displaying interface, for example, may set the desktop as the common message displaying interface of the message of privacy information/privacy call and the message of intercepted information/intercepted call.

It should be particularly noted that, the mobile terminal sets the message category and the message displaying interface corresponding to the message category according to the criteria preset by the server, which is the default setting. However, when changing or reset is needed, the message category and the message displaying interface corresponding to the message category are reset according to the need of the user.

202: Detect a message of the message category set in 201 and a current interface of the mobile terminal 1. Specifically, the detecting the message of the message category set in 201 and the current interface of the mobile terminal includes:

(1). first detecting whether the message of the set message category arrives;

(2). when the message of the message category arrives, continuing to detect whether the current interface is the message displaying interface corresponding to the message category; and (3). if the current interface is not the message displaying interface, not displaying a message notification icon of the detected message; and if the current interface is the message displaying interface, continuing to execute step 203.

2. Specifically, the detecting the message of the message category set in 201 and the current interface of the mobile terminal includes:

(1). first detecting whether the current interface is the set message displaying interface;

(2). if the current interface is the set message displaying interface, continuing to detect whether the message of the message category arrives; and (3). if it is not detected that the message of the set message category arrives, not displaying any message notification icon; and if it is detected that the message of the set message category arrives, continuing to execute step 203.

Any one of the operation processes described in the foregoing 1 and 2 can be selected randomly and performed, to choose to first detect whether the set message arrives, or to first detect whether the current interface is the message displaying interface is not limited in the embodiment of the present invention.

203: Display, on the message displaying interface, a message notification icon of the message when the current interface is the message displaying interface and the message arrives.

Specifically, when the current interface is the message displaying interface, and messages of a plurality of message categories are detected, the message notification icon of the message can only be displayed on the message displaying interface, for example, when a plurality of messages of privacy information/privacy call is detected, only one message notification icon needs to be displayed on the message displaying interface (it is supposed to be the main menu) of the messages of privacy information/privacy call.

Counting may also be performed on the detected plurality of messages, the message notification icon and the counted number of the detected messages are displayed on the message displaying interface, for example, counting is performed on the detected plurality of messages of privacy information/privacy call, and the counting result is 3, then one message notification icon and the number 3 are displayed on the message displaying interface (it is supposed to be the main menu) of the messages of privacy information/privacy call, to prompt the user the currently detected messages of privacy information/privacy call, and prompt the user that the number is 3.

In the method for displaying a notification message provided by the embodiment of the present invention, a corresponding message notification icon is displayed on a specified message displaying interface, thereby not only playing a role of reminding a user, but also preventing harassment caused by a plurality of repeated prompts on the user. In addition, a displaying interface is set, which further improves flexibility of the operation of the mobile terminal, and improves convenience of the operation and the usage efficiency.

Figure 3:
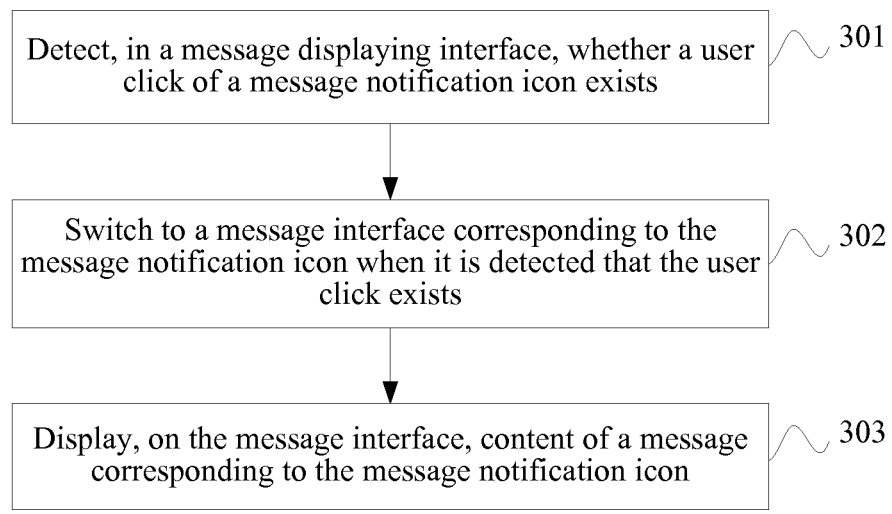
FIG. 3 is a flow chart of a method for displaying a message in accordance with some embodiments.

FIG. 3 is a flow chart of a method for displaying a message provided by an embodiment of the present invention based on the method for displaying a notification message illustrated in FIGS. 1 and 2. An executive body of an embodiment illustrated in FIG. 3 is a mobile terminal, which may implement communication software. Referring to FIG. 3, this embodiment specifically includes:

301: Detect, in a message displaying interface, whether a user click of a message notification icon exists.

302: Switch to a message interface corresponding to the message notification icon when it is detected that the user click exists.

303: Display, on the message interface, content of a message corresponding to the message notification icon.

Specifically, before the detecting, in the message displaying interface, whether the user click corresponding to the message notification icon exists, the method further includes:

switching a current interface to the message displaying interface, where the message notification icon is displayed on the message displaying interface.

Specifically, the switching to the message interface corresponding to the message notification icon when it is detected that the user click exists further includes:

performing identity authentication on a user of the user click when the user click of the message notification icon is detected, and switching to the message interface corresponding to the message notification icon after the identity authentication is passed.

Specifically, the displaying, on the message interface, the content of the message corresponding to the message notification icon includes:

when the message notification icon corresponds to a plurality of messages, respectively displaying, on the message displaying interface, content of the plurality of messages corresponding to the message notification icon.

Specifically, the displaying, on the message interface, the content of the message corresponding to the message notification icon further includes:

when the message is displayed on the message interface, and when a new message corresponding to the message notification icon arrives, automatically updating and displaying, on the message interface, content of the new message corresponding to the message notification icon.

In the method for displaying a message provided by the embodiment of the present invention, based on the method for displaying a notification message illustrated in FIGS. 1 and 2, the message interface corresponding to the message notification icon is directly switched to and entered by detecting the user click, so that the user rapidly views the content of the message, thereby improving convenience of the operation and the usage efficiency.

Figure 4:
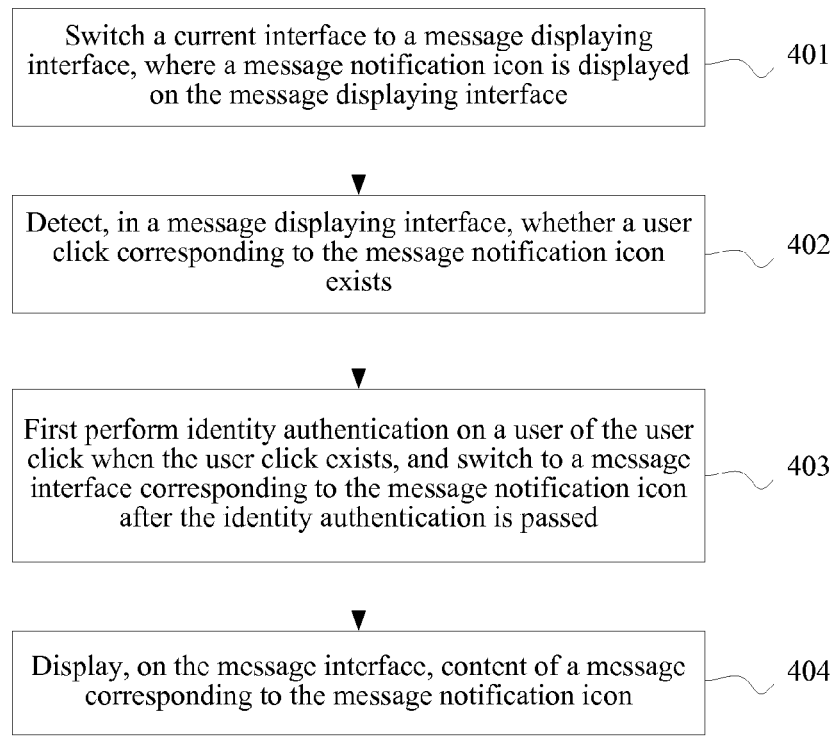
FIG. 4 is a flow chart of a method for displaying a message in accordance with some embodiments.

FIG. 4 is a flow chart of a method for displaying a message provided by an embodiment of the present invention based on the method for displaying a notification message illustrated in FIGS. 1 and 2. An executive body of this embodiment is a mobile terminal. A format of the message includes, but is not limited to, messages such as privacy information/privacy call, intercepted information/intercepted call and the like. Referring to FIG. 4, this embodiment includes:

401: Switch a current interface to a message displaying interface, where a message notification icon is displayed on the message displaying interface.

Specifically, whether the current interface is the message displaying interface is detected first. If the current interface is the message displaying interface, no switch is needed; if the current interface is not the message displaying interface, the current interface is first switched to the message displaying interface, for example, the current interface is the toolbar interface, but the message displaying interface of the message of privacy information/privacy call is a main menu interface, the current interface is switched to the main menu interface.

After the current interface is switched to the message displaying interface, if a message notification icon is displayed in the current interface, continue to execute step 402, and otherwise, end the step.

402: Detect, in a message displaying interface, whether a user click corresponding to the message notification icon exists.

Specifically, whether the user click of the message notification icon exists is detected, if yes, continue to execute step 403, and otherwise, end the step; where detecting of the user click is performed repeatedly, that is, detecting is continued after one user click is detected, and the detecting is not stopped.

403: First perform identity authentication on a user of the user click when the user click exists, and switch to a message interface corresponding to the message notification icon after the identity authentication is passed.

Specifically, a manner for identity authentication may be one or more manners such as a password, a fingerprint and a picture, which is not limited in the embodiment of the present invention, for example, when the user click of privacy information/privacy call is detected, password authentication is performed on the user, so as to confirm the identity and protect the privacy of the user. Definitely, identity authentication may also not be performed on the user of the user click, and the message interface corresponding to the message notification icon is directly switched to, which is set mainly according to the message category and the requirements of the user, for example, for the intercepted information/intercepted call, user identity authentication may not be set, and the corresponding message interface may be directly switched to.

Specifically, when the identity authentication performed on the user of the user click is not passed, the message interface corresponding to the message notification icon is not switched to.

404: Display, on the message interface, content of a message corresponding to the message notification icon.

Specifically, when the message notification icon corresponds to a plurality of messages, content of the plurality of messages is displayed respectively on the message displaying interface. The displaying sequence may be that the content is displayed from morning to night according to time, and that the content is displayed starting from the latest one according to time.

Further, the displaying, on the message interface, the content of the message corresponding to the message notification icon further includes: when the message is displayed on the message interface, and when a new user click corresponding to the message notification icon is detected, automatically updating and displaying, on the message interface, content of the latest message corresponding to the message notification icon.

In the method for displaying a message provided by the embodiment of the present invention, based on the method for displaying a notification message illustrated in FIGS. 1 and 2, the message interface corresponding to the message notification icon is directly switched to and entered by detecting the user click, so that the user rapidly views the content of the message, thereby improving convenience of the operation and the usage efficiency.

Figure 5:
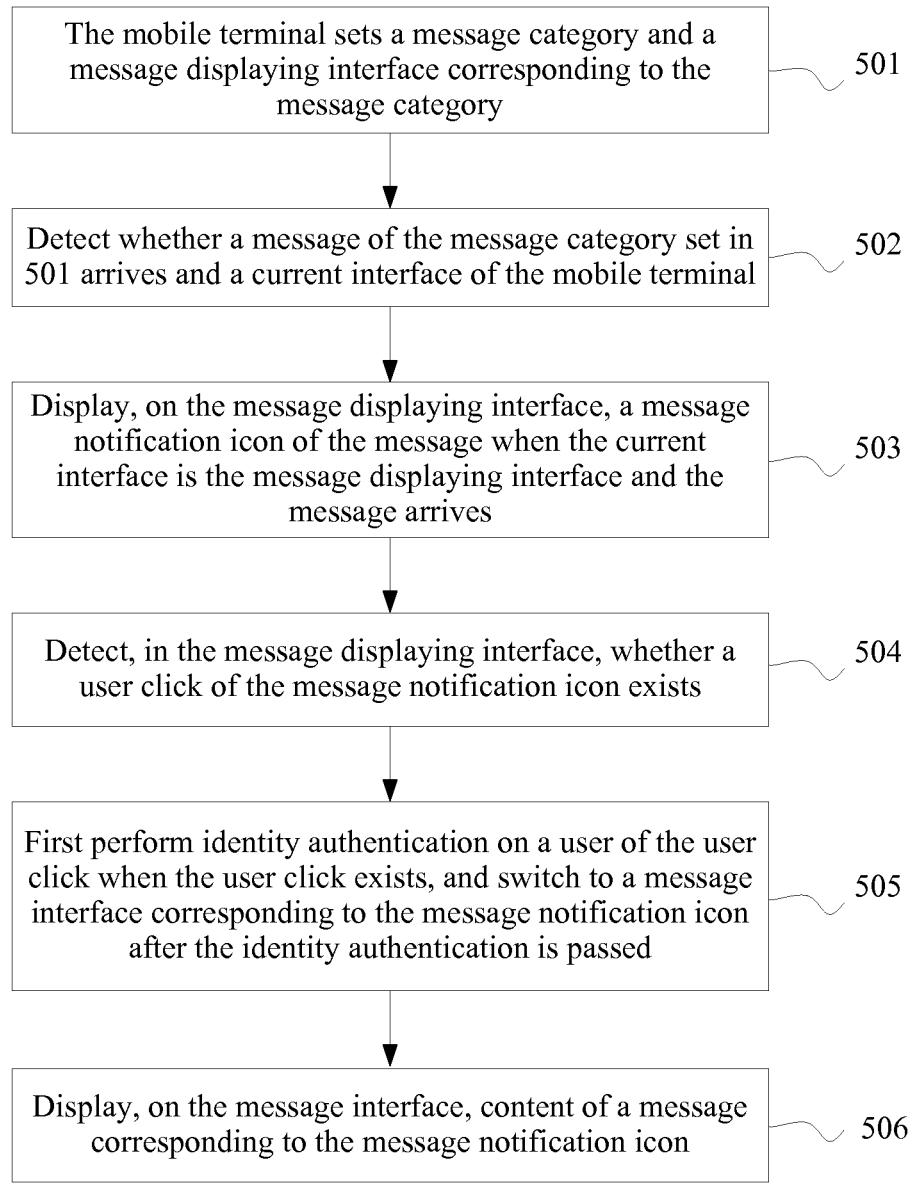
FIG. 5 is a flow chart of a method for notifying and displaying a message in accordance with some embodiments.

FIG. 5 is a flow chart of a method for notifying and displaying a message provided by an embodiment of the present invention. An executive body of this embodiment is a mobile terminal. A format of the message includes, but is not limited to, messages such as privacy information/privacy call, intercepted information/intercepted call and the like. Referring to FIG. 5, this embodiment includes:

501: The mobile terminal sets a message category and a message displaying interface corresponding to the message category.

Specifically, that the mobile terminal sets the message category and the message displaying interface corresponding to the message category includes:

that the mobile terminal may set one message category or a plurality of message categories according to requirements of the user, for example, may set a message category of privacy information/privacy call, and may also set two message categories, namely privacy information/privacy call and intercepted information/intercepted call, and definitely, may set a plurality of message categories, where the number of the set message categories may be selected flexibly according to actual requirements, which is not limited in the embodiment of the present invention.

When the mobile terminal finishes setting the required message category according to the requirements of the user, the mobile terminal sets the message displaying interface corresponding to the message category according to the set message category, for example, may set a message of privacy information/privacy call to be displayed on a desktop, that is, set the desktop as a message displaying interface of the message of privacy information/privacy call, and may also set other interfaces such as a short message interface, a toolbar interface and the like, which can be set flexibly according to the habits and requirements of the user.

The message category and the message displaying interface may be set through a keyboard, a button of the mobile terminal, or through handwriting and voice action or the like, which is not limited in the embodiment of the present invention.

In addition, it should be noted that, when the message category set by the user needs to be changed (for example, cancel the message of intercepted information/intercepted call), the message category can be canceled or added at any time; when the message displaying interface corresponding to the message category needs to be changed (for example, change the message displaying interface of the message of intercepted information/intercepted call from a main menu interface to the toolbar interface), the change may also be made flexibly.

The mobile terminal may set one message category according to the requirements of the user, and set one message displaying interface for one message category correspondingly, for example, may set the message category of privacy information/privacy call, and set a desktop corresponding to the message as the message displaying interface.

The mobile terminal may also set a plurality of message categories in the mobile terminal, and each message category corresponds to the message displaying interface set respectively; for example, may set the desktop as the message displaying interface of the message of privacy information/privacy call, and set the toolbar interface as the message displaying interface of the message of intercepted information/intercepted call.

The mobile terminal may also set a plurality of message categories in the mobile terminal, and the plurality of message categories corresponds to one message displaying interface, for example, may set the desktop as the common message displaying interface of the message of privacy information/privacy call and the message of intercepted information/intercepted call.

It should be particularly noted that, the mobile terminal may set the message category and the message displaying interface corresponding to the message category according to the parameter preset by the server, and the mobile terminal tolerates the setting of the server, but when the user needs to change or reset it, the message category and the message displaying interface corresponding to the message category are reset according to the requirements of the user.

502: Detect whether a message of the message category set in 501 arrives and a current interface of the mobile terminal 1. Specifically, the detecting the message of the message category set in 501 and the current interface of the mobile terminal includes:

(1). first detecting whether the message of the set message category arrives;

(2). when the message of the message category arrives, continuing to detect whether the current interface is the message displaying interface corresponding to the message category; and (3). if the current interface is not the message displaying interface, not displaying a message notification icon of the message; and if the current interface is the message displaying interface, continuing to execute step 503.

2. Specifically, the detecting the message of the message category set in 501 and the current interface of the mobile terminal includes:

(1). first detecting whether the current interface is the set message displaying interface;

(2). if the current interface is the set message displaying interface, continuing to detect whether the message of the message category arrives; and (3). if it is not detected that the message of the set message category arrives, not displaying any message notification icon; and if it is detected that the message of the set message category arrives, continuing to execute step 503.

Any one of the operation processes described in the foregoing 1 and 2 can be selected randomly and performed, to choose to first detect whether the set message arrives, or to first detect whether the current interface is the message displaying interface is not limited in the embodiment of the present invention.

503: Display, on the message displaying interface, a message notification icon of the message when the current interface is the message displaying interface and the message arrives.

Specifically, when the current interface is the message displaying interface, and messages of a plurality of message categories are detected, the message notification icon of the message can only be displayed on the message displaying interface, for example, when a plurality of messages of privacy information/privacy call is detected, only one message notification icon needs to be displayed on the message displaying interface (it is supposed to be the main menu) of the messages of privacy information/privacy call.

Counting may also be performed on the detected plurality of messages, the message notification icon and the counted number of the detected messages are displayed on the message displaying interface, for example, counting is performed on the detected plurality of messages of privacy information/privacy call, and the counting result is 3, then one message notification icon and the number 3 are displayed on the message displaying interface (it is supposed to be the main menu) of the messages of privacy information/privacy call, to prompt the user the currently detected messages of privacy information/privacy call, and prompt the user that the number is 3.

504: Detect, in the message displaying interface, whether a user click of the message notification icon exists.

Specifically, whether the user click of the message notification icon exists is detected, if yes, continue to execute step 503, and otherwise, end the step; where detecting of the user click is performed repeatedly, that is, detecting is continued after one user click is detected, and the detecting is not stopped.

505: First perform identity authentication on a user of the user click when the user click exists, and switch to a message interface corresponding to the message notification icon after the identity authentication is passed.

Specifically, a manner for identity authentication may be one or more manners such as a password, a fingerprint and a picture, which is not limited in the embodiment of the present invention, for example, when the user click of privacy information/privacy call is detected, password authentication is performed on the user, so as to confirm the identity and protect the privacy of the user. Definitely, identity authentication may also not be performed on the user of the user click, and the message interface corresponding to the message notification icon is directly switched to, which is set mainly according to the message category and the requirements of the user, for example, for the intercepted information/intercepted call, user identity authentication may not be set, and the corresponding message interface may be directly switched to.

Specifically, when the identity authentication performed on the user of the user click is not passed, the message interface corresponding to the message notification icon is not switched to.

506: Display, on the message interface, content of a message corresponding to the message notification icon.

Specifically, when the message notification icon corresponds to a plurality of messages, content of the plurality of messages is displayed respectively on the message displaying interface. The displaying sequence may be that the content is displayed from morning to night according to time, and that the content is displayed starting from the latest one according to time. For example, when the message notification icon.

Specifically, the displaying, on the message interface, the content of the message corresponding to the message notification icon further includes: when the message is displayed on the message interface, and when a new user click corresponding to the message notification icon is detected, automatically updating and displaying, on the message interface, content of the latest message corresponding to the message notification icon.

In the method for notifying and displaying a message provided by the embodiment of the present invention, the corresponding message notification icon is displayed on the specified interface, and the corresponding message interface is entered by clicking the message notification icon, thereby not only playing a role of reminding the user, and preventing harassment on the user, but also directly entering the required message interface, thereby improving convenience of the operation and the usage efficiency.

Figure 6:
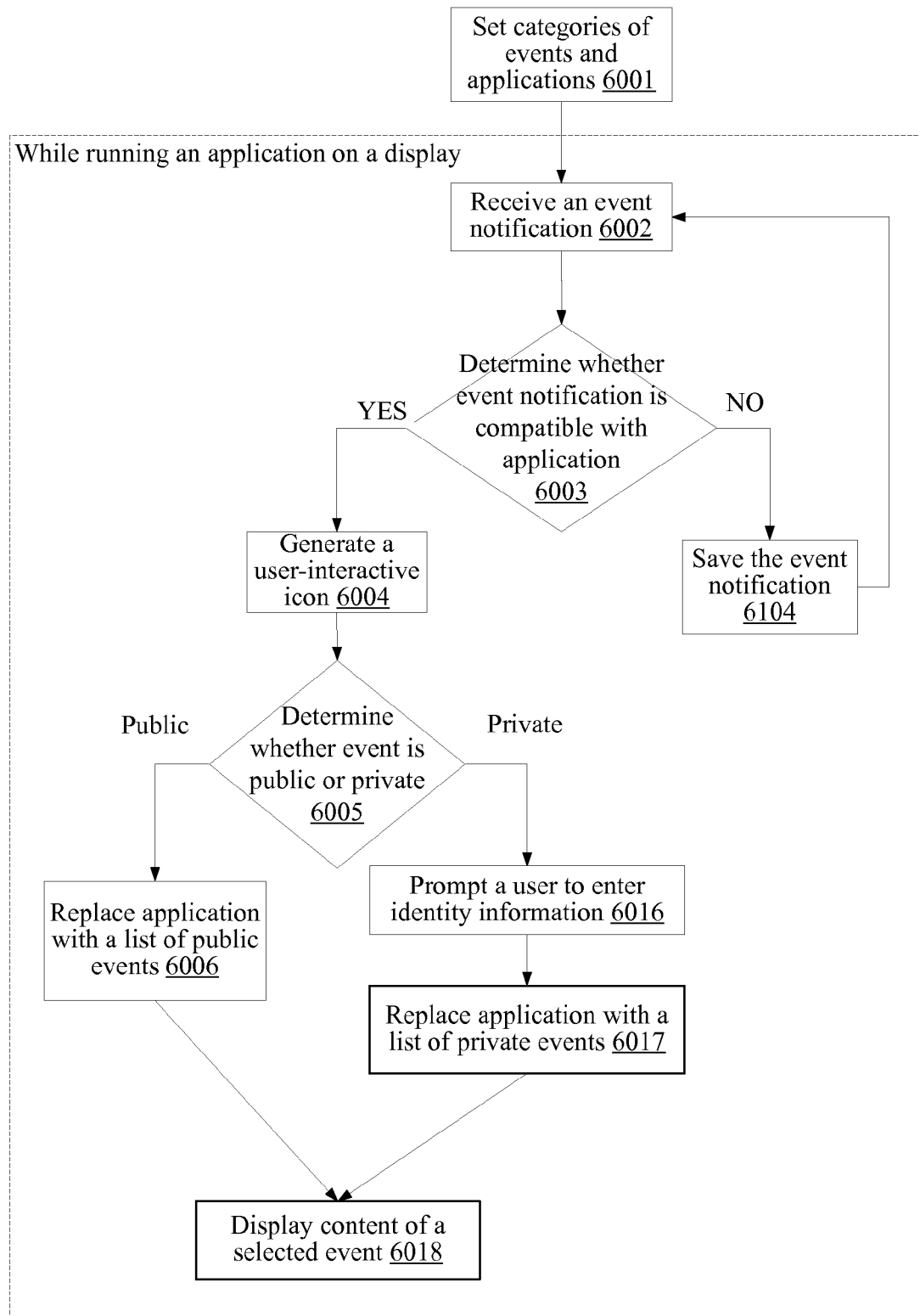
FIG. 6 is a flow chart of a method for processing and displaying an event notification in accordance with some embodiments.

FIG. 6 is a flow chart of a method for processing and displaying an event notification in accordance with some embodiments. FIGS. 10A to 10E are exemplary screenshots of a mobile terminal in accordance with some embodiments. The method is performed at a mobile terminal having one or more processors and memory for storing one or more programs to be executed by the one or more processors. In accordance with some embodiments, events can be a calendar appointment, a message, a planned activity, an application update reminder, or any other matter that may receive attention from a user. A message can be a message from another cell phone, an email, a message from an instant communicator or any other message that is written or edited by a user of another cell phone or computer.

Figure 9:
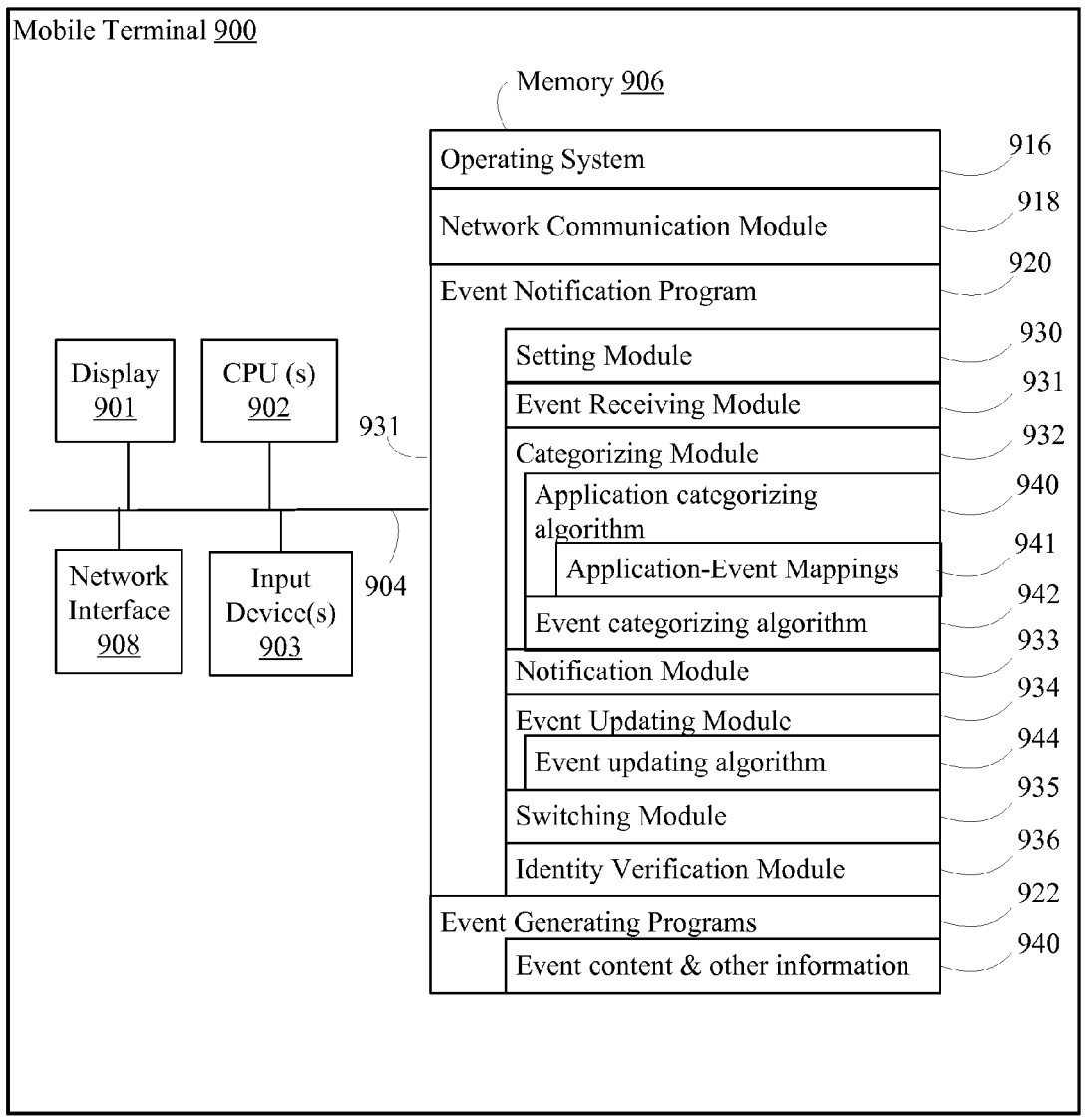
FIG. 9 is another schematic structural diagram of a mobile terminal in accordance with some embodiments.

In step 6001, categories of events and applications are set. Events can be categorized as either public or private events. The criteria can be set by developers of an application or by the user. For example, a user may set or change to criteria including the type of the event, the identity of the person who sends the message if the event is a message, the key words in an event, etc. The user may designate a particular event as private or public. For example, when setting up an appointment in a calendar, the user can set the particular appointment as private. The method may provide an event categorizing algorithm 942 as illustrated in FIG. 9 for recognizing an event as private or public based on the criteria discussed above.

In accordance with some embodiments, categories of applications can be set by developers of an application or by the user. Some categories of applications may be compatible with event notifications, so that a user-interactive icon will be generated when an event notification is generated. Some categories of applications are not compatible with event notifications. In some implementations, some categories of applications are selective with what event notifications they are compatible with. A category of applications may be compatible with a particular type of events, application update reminders, but no other types of events. Another category of applications may be only compatible with public events, but not private events. The method may provide an application categorizing algorithm 940 as illustrated in FIG. 9 for determining whether an event notification is compatible with an application that is on display based on the criteria discussed above.

Figure 7:
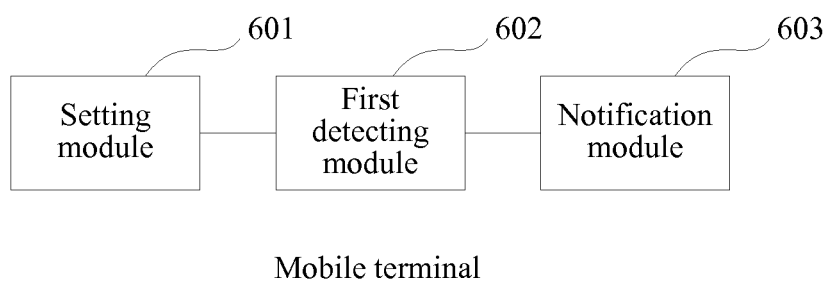
FIG. 7 is a schematic structural diagram of a mobile terminal in accordance with some embodiments.

In accordance with some embodiments, step 6001 is processed in module 701 as illustrated in FIG. 7. Step 6001 may also comprise the step 101 illustrated in FIG. 1, step 201 illustrated in FIG. 2 and step 501 illustrated in FIG. 5.

Figure 10A:
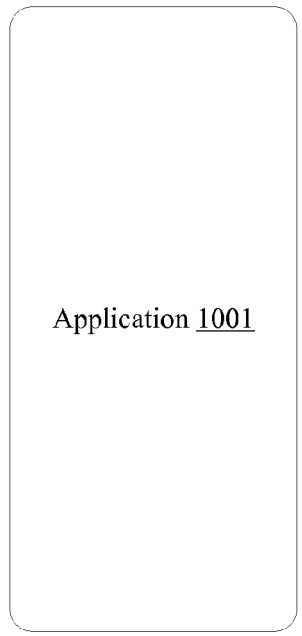
FIGS. 10A to 10E are exemplary screenshots of a mobile terminal in accordance with some embodiments.

In step 6002, while running an application on a display of the mobile terminal, the terminal receives an event notification. For example, an email comes in or a calendar reminds that it is time to have lunch with a friend. FIG. 10A depicts an exemplary screenshot of the display of the mobile terminal. There is an application 1001 running on the display of the mobile terminal. The application 1001 may be a music or video player application.

In accordance with some embodiments, step 6002 is processed in module 602.

In step 6003, after receiving the event notification, the mobile terminal determines whether the event notification is compatible with the application 1001. If so, the mobile terminal renders a user-interactive icon for the event notification on the display. The determining process may be utilizing the application categorizing algorithm 940 as illustrated in FIG. 9. For example, the application categorizing algorithm 940 includes a set of application-event mappings 941. In some embodiments, the mappings are one-to-many mappings. For each application, there are one or more event types that are defined to be compatible with the application. In some other embodiments, the mappings are many-to-many mappings. For each application, there are one or more event types that are defined to be compatible with the application; and for each event type, there are one or more applications that are defined to be compatible with the event type. Such mapping relationship is defined by a user of the mobile terminal and may be updated from time to time. For example, a user may temporarily suspend the mapping between the video player application and the email arrival event type so that he or she can watch a video without any disruption.

In accordance with some embodiments, step 6003 is processed in module 702 illustrated in FIG. 7. Steps 6002 and 6003 may comprise the step 102 illustrated in FIG. 1, step 202 illustrated in FIG. 2 and step 502 illustrated in FIG. 5.

Figure 10B:
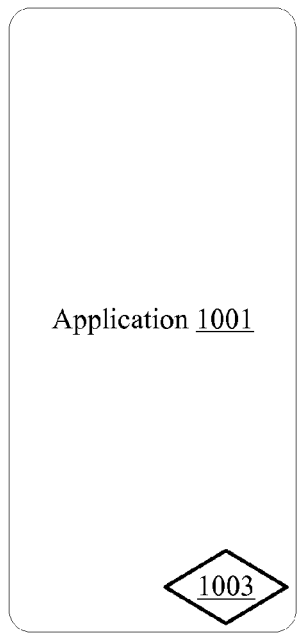

In step 6004, if the event notification is compatible with the application that is run on the display, the terminal generates a user-interactive icon for the event notification at a predefined location on the display. The predefine location may vary according to the application that is run on the display. FIG. 10B depicts an exemplary screenshot of the same application 1001 with a user-interactive icon 1003 at the corner of the display. In some embodiments, the mobile terminal does not interrupt or pause the application 1001 while rendering the user-interactive icon 1003. But the mobile terminal may change the visual cue (e.g., color or brightness) of the user-interactive icon 1003 to bring it to the user's attention.

In accordance with some embodiments, step 6004 is processed in module 703 illustrated in FIG. 7. Step 6004 may also comprise the step 103 illustrated in FIG. 1, step 203 illustrated in FIG. 2 and step 503 illustrated in FIG. 5.

In step 6104, if the even notification is not compatible with the application that is run on the display, the event will be saved. Otherwise, the terminal returns to step 6002 and waits for the next event notification.

In step 6005, in response to a user selection of the user-interactive icon, the terminal determines whether the event notification corresponds to a public event or a private event. The determining process may utilize the event categorizing algorithm 942.

Figure 10C:
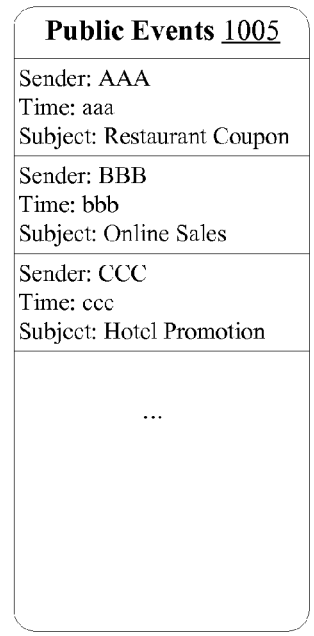

In step 6006, if the event notification corresponds to a public event, the terminal replaces the application with a display of a list of public events including the public event corresponding to the event notification. FIG. 10C depicts a screenshot of the display including a list of public events 1005. In this example, the list of public events includes marketing or promotional messages that the user is not concerned with any of them being exposed to somebody else. For each message, there is a sender, a timestamp, and a subject from which the user can learn the nature of the message without opening the message. If the user wants to know more about the message, he or she can select one of them by finger-tapping the message (e.g., if the display is a touch-sensitive display).

Figure 10D:
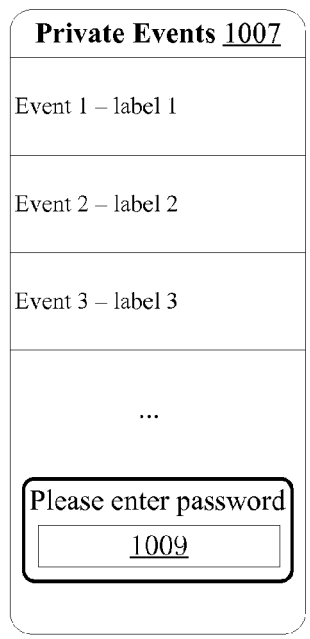

In step 6016, if the event notification corresponds to a private event, the terminal prompts a user to enter identity information for accessing private events. Entering the identity information may include inputting a password, typing an answer to a question, swapping a finger to have a fingerprint scanned, speaking to the terminal, having a camera recognizing the face of the user, etc. FIG. 10D depicts a list of private events 1007. In this example, the list of private events provides little information before the user enters his or her password 1009. By doing so, the user does not have to worry that information associated with the private events may be exposed to another person when the user is at a place where privacy is guaranteed (e.g., if the user is in a crowded public transit). If some embodiments, each of the private events in the list is associated with a label as shown in FIG. 10D. The label is used for classifying the private events into, e.g., financial, health, work, family classes. From the label, the user at least can appreciate the basic nature of a private event. For example, if the user just has a medical examination, he or she can tell that a private event with a label "health" may be related to the examination result. The presence of the screenshot shown in FIG. 10D gives the user a chance to determine whether he or she is comfortable to learn more details about a private event after knowing some basic information of the event without having privacy concern. In some embodiments, the labels are pre-generated by the user based on his or her own preference to maximize the privacy protection. For example, the user may choose the word "Henry" for "Health" and "Frank" for "Family," etc.

Figure 10E:
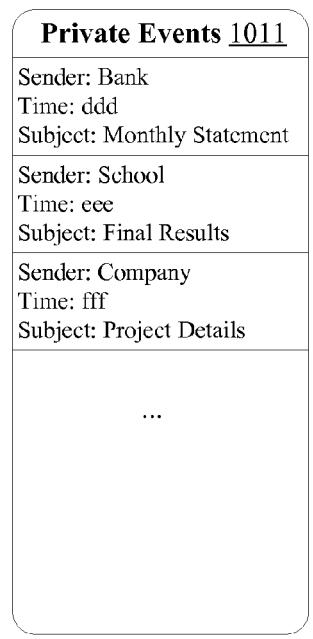

In step 6017, if the identification information is verified by the terminal, the terminal replaces the application with a display of a list of private events including the private event corresponding to the event notification. FIG. 10E depicts more information of the list of private events 1011 after the user-entered password has been verified. In this example, the first private event relates to a bank's monthly statement, the second one to the final results from the school, and the third one to the work-related project details. Like the public events, a user can select one of the private events through a finger-tapping.

The list of events, either the list of private events in step 6017 or the list of public events in step 6006, can be displayed according to certain settings. In accordance with some embodiments, a private event displayed in a list of private events is displayed with fewer details than a public event that is displayed in a list of public events. For example, if a message is a public event, the message in a list of public events may display the first 10 words of the message in addition to the sender and the time so that the user may have a rough idea of the content of the message. If a message is a private event, the message in a list of private events may only display the sender and the time in order to protect the privacy of the user.

In accordance with some embodiments, some types of events may have priority or exclusivity in the list of events. For example, if the event notification corresponds to a message, the list of events may only include messages. For another example, if the event notification corresponds to an appointment reminder, the list of events may display all future appointments on top of the list and display other events after appointments. For another example, the user may set up a rule that when a particular application is run on the display, only events related with business are displayed in the list of events. For another example, the list of the event only display events that have not received user selections, have not been viewed by the user or have not expired.

To set up a list of events according to various criteria, an event updating algorithm 944 may be set up. The algorithm can acquire information from all events notification and determine which event would be displayed in a list based on the event information and some or all of the criteria in preceding paragraphs.

In step 6018, in response to a user selection of an event in a list of events, the terminal replaces the list of events with display of the content of the selected event. If the event is a message, the content of the message is displayed in response to the selection.

Figure 8:
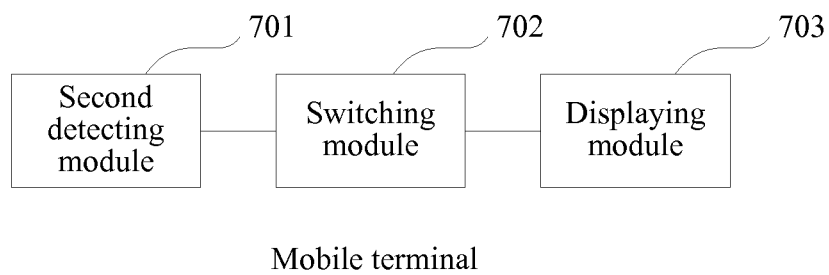
FIG. 8 is another schematic structural diagram of a mobile terminal in accordance with some embodiments.

In accordance with some embodiments, step 6018 is processed in modules 801, 802 and 803 illustrated in FIG. 8. Step 6018 may comprise the steps 301-303 illustrated in FIG. 3.

FIG. 7 is a schematic structural diagram of a mobile terminal provided by an embodiment of the present invention. Referring to FIG. 7, the mobile terminal includes:

a setting module 701, configured to set a message category and a message displaying interface corresponding to the message category in the mobile terminal;

a first detecting module 702, configured to detect whether a message of the message category arrives and a current interface of the mobile terminal; and a notification module 703, configured to display, on the message displaying interface, a message notification icon of the message when the current interface is the message displaying interface and the message arrives.

The first detecting module 702 includes:

a first detecting unit, configured to detect whether the message of the message category arrives; and detect whether the current interface is the message displaying interface when the message of the message category arrives.

The first detecting module 702 includes:

a second detecting unit, configured to detect whether the current interface is the message displaying interface; and detect whether the message of the message category arrives when the current interface is the message displaying interface.

The setting module 701 includes:

a first setting unit, configured to set one message category in the mobile terminal, and set that the message category corresponds to one message displaying interface;

a second setting unit, configured to set a plurality of message categories in the mobile terminal, and respectively set that each message category corresponds to one message displaying interface; and a third setting unit, configured to set a plurality of message categories in the mobile terminal, and set that the plurality of message categories corresponds to one message displaying interface.

The setting module 701 includes:

a fourth setting unit, configured to set the message category and the message displaying interface corresponding to the message category according to requirement information of a user; and a fifth setting unit, configured to set the message category and the message displaying interface corresponding to the message category according to a parameter preset by a server.

The notification module 703 is further configured to: when a plurality of messages arrives, count the messages, and display, on the message displaying interface, a message notification icon of the messages and the counted number of the messages.

In the mobile terminal provided by the embodiment of the present invention, it is set that a corresponding message notification icon is displayed on a specified message displaying interface, thereby not only playing a role of reminding a user, but also preventing harassment caused by a plurality of repeated prompts on the user. In addition, a displaying interface is set, which further improves flexibility of the operation of the mobile terminal, and improves convenience and efficiency of the operation.

FIG. 8 is a schematic structural diagram of a mobile terminal provided by an embodiment of the present invention. Referring to FIG. 8, the mobile terminal includes:

a second detecting module 801, configured to detect, in a message displaying interface, whether a user click of a message notification icon exists;

a switching module 802, configured to switch to a message interface corresponding to the message notification icon when it is detected that the user click exists; and a displaying module 803, configured to display, on the message interface, content of a message corresponding to the message notification icon.

The second detecting module 801 further includes:

a switching unit, configured to switch a current interface to the message displaying interface, where the message notification icon is displayed on the message displaying interface.

The switching module 802 further includes:

an authentication unit, configured to perform identity authentication on a user of the user click when the user click of the message notification icon is detected, and switch to the message interface corresponding to the message notification icon after the identity authentication is passed.

The displaying module 803 includes:

a first displaying unit, configured to: when the message notification icon corresponds to a plurality of messages, respectively display, on the message displaying interface, content of the plurality of messages corresponding to the message notification icon.

The displaying module 803 further includes:

a second displaying unit, configured to: when the message is displayed on the message interface, and when a new message corresponding to the message notification icon arrives, automatically update and display, on the message interface, content of the new message corresponding to the message notification icon.

FIG. 9 is a diagram of an example implementation of a mobile computing terminal 900 (e.g., a laptop or a smart phone) in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the mobile terminal 900 includes one or more processing units (CPU's) 902, one or more network or other communications interfaces 908, a display 901, one or more input devices 903, memory 906, and one or more communication buses 904 for interconnecting these and various other components. The communication buses may include circuitry (sometimes called a chipset) that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. The memory 906, including the non-volatile and volatile memory device(s) within the memory 906, comprises a non-transitory computer readable storage medium In some implementations, the memory 906 or the non-transitory computer readable storage medium of the memory 906 stores the following programs, modules and data structures, or a subset thereof including an operating system 916, a network communication module 918, a event notification program 920 and event generating programs 922. The event notification program 920 includes a setting module 930, an event receiving module 931, a categorizing module 932, a notification module 933, an event updating module 934, a switching module 935, and an identity verification module 936.

The operating system 916 includes procedures for handling various basic system services and for performing hardware dependent tasks.

The network communication module 618 facilitates communication with other devices via the one or more communication network interfaces 608 (wired or wireless) and one or more communication networks, such as the internet, other wide area networks, local area networks, metropolitan area networks, and so on.

The setting module 930 is configured to receive instructions from a user regarding setting criteria on categorizing events and applications. The setting module 930 may store a default setting which is subject to change by users.

The event receiving module 931 is configured to receive an event notification from event generating programs 922. A person of ordinary skill in the art would realize that events may come from different programs. The event receiving module 931 is configured to acquire event information from event generating programs 922 and to send the information to other modules.

The categorizing module 932 is configured to determine whether an event notification is compatible with the application and to determine whether an event notification corresponds to a public event or a private event. The categorizing module 932 includes the application categorizing algorithm 940 and the event categorizing algorithm 942. The application categorizing algorithm 940 is configured to recognize the application that is run on the display and to determine whether it is compatible with a particular event notification based on pre-set criteria. The event categorizing algorithm 942 can be based on criteria described step 6001.

The notification module 933 is configured to generate a user-interactive icon for the event notification at a predefined location on the display.

The switching module 935 is configured to replace an application that is run on the display with a display of a list of public events and to replace an application that is run on the display with a display of a list private events.

The event updating module 934 is configured to produce the events that are displayed in the list of events. The criteria of which event is displayed in a list may be set and changed by a user. An event updating algorithm may be used to make the determination as discussed in step 6017 illustrated in FIG. 6.

Identity verification module 936 is configured to prompt a user to enter identity information for accessing private events and to verify the entered identity information. A person skilled in the art would recognize that identity verification module 936 does not have to be within the event notification program. A mobile terminal or a mobile terminal may have an independent identity verification module or program. The event notification program can use such module or program in the process described in various embodiments.

Event generating programs 922 include any programs that may generate events, e.g., a message management program, a calendar, a security application, an alarm clock, etc. Event content and other information of the event 940 are contained in these programs, which may be acquired by event receiving module 931.

In the mobile terminal provided by the embodiment of the present invention, the message interface corresponding to the message notification icon is directly switched to and entered by detecting the user click, so that the user rapidly views the content of the message, thereby improving convenience of the operation and the usage efficiency.

It should be noted that: when the mobile terminal provided by the foregoing embodiments notifies and displays a message, it is illustrated with an example of division of each function module. In the practical application, the function distribution may be finished by different function modules according to the requirements, that is, the internal structure of the mobile terminal is divided into different function modules, so as to finish all or part of the functions described above. Besides, the mobile terminal, the mobile terminal and the method provided by the foregoing embodiments for notifying and displaying a message belong to one concept. For the specific implementing procedure, see the method embodiment, which will not be described herein again.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, an optical disk or the like.

The above descriptions are merely exemplary embodiments of the present invention, but are not intended to limit the present invention. Any modification, equivalent replacement, or improvement made without departing from the spirit and principle of the present invention should fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for processing event notifications at a mobile terminal having one or more processors and memory for storing one or more programs to be executed by the one or more processors, the method comprising:

while running an application on a display of the mobile terminal:

receiving an event notification;
   if the event notification is compatible with the application, generating a user-interactive icon for the event notification at a predefined location on the display;
   in response to a user selection of the user-interactive icon, determining whether the event notification corresponds to a public event or a private event;
   if the event notification corresponds to a public event, replacing the application with a display of a list of public events including the public event corresponding to the event notification; and
   if the event notification corresponds to a private event:
      prompting a user to enter identity information for accessing private events; and
      replacing the application with a display of a list of private events including the private event corresponding to the event notification after verifying the user-entered identity information.

2. The method of claim 1, wherein the identity information is a password.

3. The method of claim 1, wherein an event is one selected from the group consisting of a calendar appointment, a message, a planned activity, an application update reminder, and a status update of the mobile terminal.

4. The method of claim 3, wherein the message is one selected from the group consisting of a message from another cell phone, an email, and a message from an instant communicator.

5. The method of claim 3, wherein when the event is a message, determining whether the event notification corresponds to a public event or a private event is based on criteria that include the identity of the person who sends the message.

6. The method of claim 5, wherein the criteria are set by the user.

7. The method of claim 3, wherein when the event is a message, the list of events that are displayed only include messages.

8. The method of claim 1, further comprising: in response to a user selection of an event in a list of the events, replacing the display of the list of events with display of content of the selected event.

9. The method of claim 1, wherein the list of events only include events that have not been viewed by the user.

10. The method of claim 1, wherein when displayed in a list, a private event is displayed with fewer details than a public event.

11. A mobile terminal, comprising:
   one or more processors;
   memory; and
   one or more programs stored in the memory and to be executed by the processor, the one or more programs including instructions for:
      while running an application on a display of the mobile terminal:
         receiving an event notification;
         if the event notification is compatible with the application, generating a user-interactive icon for the event notification at a predefined location on the display;
         in response to a user selection of the user-interactive icon, determining whether the event notification corresponds to a public event or a private event;
         if the event notification corresponds to a public event, replacing the application with a display of a list of public events including the public event corresponding to the event notification; and
         if the event notification corresponds to a private event:
            prompting a user to enter a password for accessing private events; and
            replacing the application with a display of a list of private events including the private event corresponding to the event notification after verifying the user-entered identity information.

12. The mobile terminal of claim 11, wherein the identity information is a password.

13. The mobile terminal of claim 11, wherein an event is one selected from the group consisting of a calendar appointment, a message, a planned activity, an application update reminder, and a status update of the mobile terminal.

14. The mobile terminal of claim 13, wherein the text message is one selected from the group consisting of a message from another cell phone, an email, and a message from an instant communicator.

15. The mobile terminal of claim 13, wherein when the event is a message, determining whether the event notification corresponds to a public event or a private event is based on criteria that include the identity of the person who sends the message.

16. The mobile terminal of claim 13, wherein when the event is a message, the list of events that are displayed include only messages.

17. The mobile terminal of claim 11, wherein the one or more programs further include instructions for: in response to a user selection of an event in a list of the events, replacing the display of the list of events with display of content of the selected event.

18. The mobile terminal of claim 11, wherein the list of events only include events that have not been viewed by the user.

19. The mobile terminal of claim 11, wherein when displayed in a list, a private event is displayed with fewer details than a public event.

* * * * *